United States Patent
Dekel et al.

(10) Patent No.: US 9,421,795 B2
(45) Date of Patent: Aug. 23, 2016

(54) PALLET CONVEYORS FOR PRINTERS

(71) Applicant: Hewlett-Packard Industrial Printing Ltd., Netanya (IL)

(72) Inventors: Yaron Dekel, Netanya (IL); Yuval Dim, Netanya (IL); Alex Veis, Netanya (IL)

(73) Assignee: Hewlett-Packard Industrial Printing LTD, Netanya (IL)

( * ) Notice: Subject to any disclaimer, the term of this patent is extended or adjusted under 35 U.S.C. 154(b) by 0 days.

(21) Appl. No.: 14/918,324

(22) Filed: Oct. 20, 2015

(65) Prior Publication Data

US 2016/0129699 A1    May 12, 2016

(30) Foreign Application Priority Data

Nov. 6, 2014 (EP) .................................... 14192123

(51) Int. Cl.
*B41J 11/00* (2006.01)
*B65G 37/00* (2006.01)
*B65H 5/04* (2006.01)

(52) U.S. Cl.
CPC .............. *B41J 11/007* (2013.01); *B65G 37/00* (2013.01); *B65H 5/04* (2013.01)

(58) Field of Classification Search
CPC ......... B41J 11/007; B41J 11/02; B41J 11/30; B41J 11/42; B65G 37/00; B65G 37/005; B65G 17/06; B65G 17/12; B65G 17/18; B65G 17/32; B65G 17/48; B65G 17/123; B65G 21/20; B65G 47/38
See application file for complete search history.

(56) References Cited

U.S. PATENT DOCUMENTS

| | | | |
|---|---|---|---|
| 4,430,012 A | 2/1984 | Kooy et al. | |
| 4,807,790 A | 2/1989 | Ushioda et al. | |
| 4,965,597 A | 10/1990 | Ohigashi et al. | |
| 5,297,059 A * | 3/1994 | Kawasoe | G05B 23/0235 702/121 |
| 5,696,690 A | 12/1997 | Richardson et al. | |
| 5,784,956 A | 7/1998 | Walz | |
| 5,954,189 A * | 9/1999 | Averill | B41F 5/24 198/803.5 |
| 6,072,587 A | 6/2000 | Hicks | |
| 6,325,480 B1 | 12/2001 | Moghadam et al. | |
| 6,663,712 B2 | 12/2003 | Doyle et al. | |
| 6,948,901 B2 | 9/2005 | Allemann | |
| 7,722,151 B2 | 5/2010 | Elenes et al. | |
| 8,047,646 B2 * | 11/2011 | Ando | B41J 3/28 347/104 |
| 8,919,950 B2 * | 12/2014 | Veis | B41J 11/007 347/101 |
| 9,067,408 B2 * | 6/2015 | Veis | B41J 11/06 |
| 9,266,362 B2 * | 2/2016 | Veis | B41J 11/007 |
| 2009/0056567 A1 | 3/2009 | Ando et al. | |
| 2013/0088554 A1 | 4/2013 | Veis | |

FOREIGN PATENT DOCUMENTS

| | | |
|---|---|---|
| EP | 1613480 | 11/2007 |
| JP | 2000158731 | 6/2000 |

OTHER PUBLICATIONS

European Extended Search Report dated Apr. 14, 2015, issued on EP Patent Application No. 14192123.9 dated Nov. 6, 2014, European Patent Office.

* cited by examiner

*Primary Examiner* — Anh T. N. Vo

(74) *Attorney, Agent, or Firm* — HP Inc Patent Department

(57) ABSTRACT

Pallet conveyors for printers are disclosed. In example implementations a pallet conveyor for a printer comprises a track, a train pallet to circulate on the track and a wagon pallet to circulate on the track towed by the train pallet. The train and wagon pallets may support a print substrate.

15 Claims, 5 Drawing Sheets

PALLET CONVEYORS FOR PRINTERS

CLAIM FOR PRIORITY

The present application claims priority to European patent application number 14192123.9, having a filing date of Nov. 6, 2014, entitled "Pallet Conveyors For Printers", which is incorporated by reference in its entirety.

BACKGROUND

Some pallet conveyors for printers include a plurality of pallets (or bars) arranged to circulate on an endless track. The pallets support and move print media during printing in a print zone of the printer. Accordingly, the pallets circulate back to the print zone via a handling zone without supporting any print media. A controller individually controls the velocity of the pallets.

In these systems, each pallet is equipped with electromagnetic elements or magnetic responsive material so that its velocity to be individually controlled by the controller relative to the endless track.

BRIEF DESCRIPTION

Some non-limiting examples of pallet conveyors for printers will be described in the following with reference to the appended drawings, in which.

Figure 4:
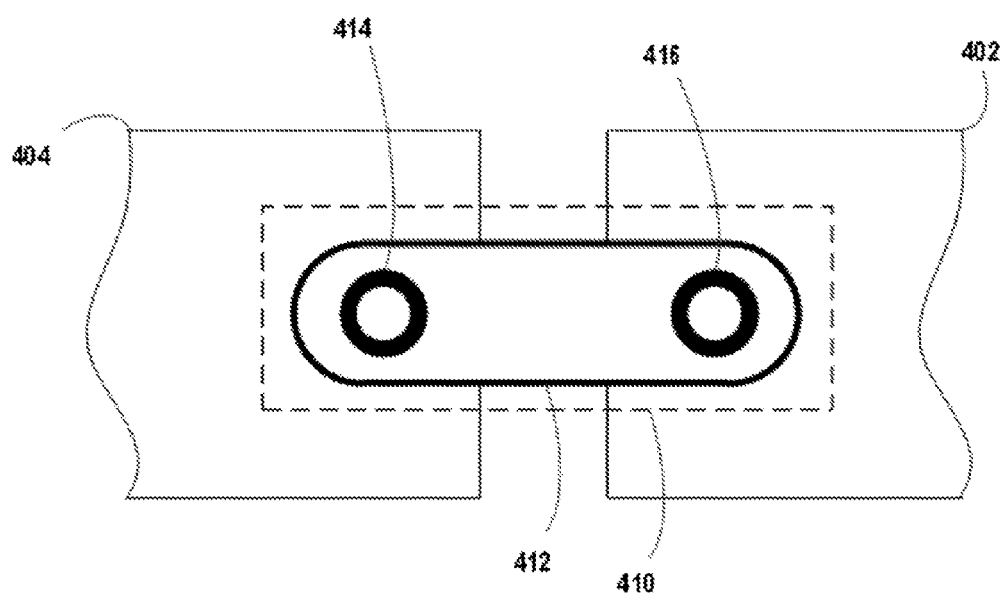

FIG. 4 schematically illustrates a detail of a coupling between two pallets.

Figure 5:
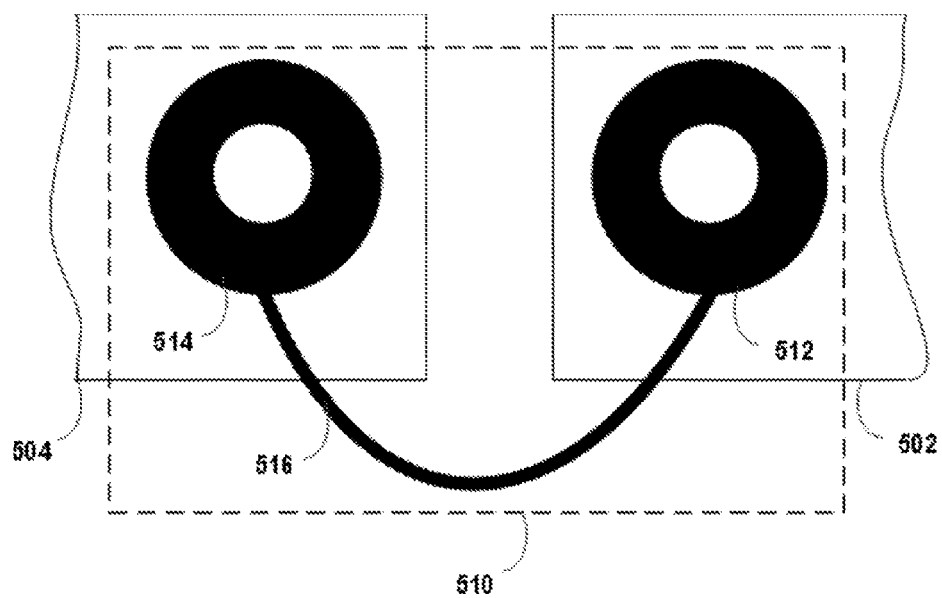

FIG. 5 schematically illustrates a detail of a coupling between two train-and-wagon configurations.

DETAILED DESCRIPTION

In some pallet conveyors for printers, the velocity of the pallets is individually controlled. The pallets are equipped with either electromagnetic elements or with magnetic responsive material depending on the implementation. In some cases the pallets are equipped with motors, encoder heads and drivers in each side. In other examples, the pallets include magnetic elements and are driven by a linear motor that is arranged along the track.

The bill of materials (BOM) of the pallets may be high. The present disclosure provides solutions that at least partially reduce the BOM and improve the cost effectiveness of the pallet conveyors involved.

Figure 1:
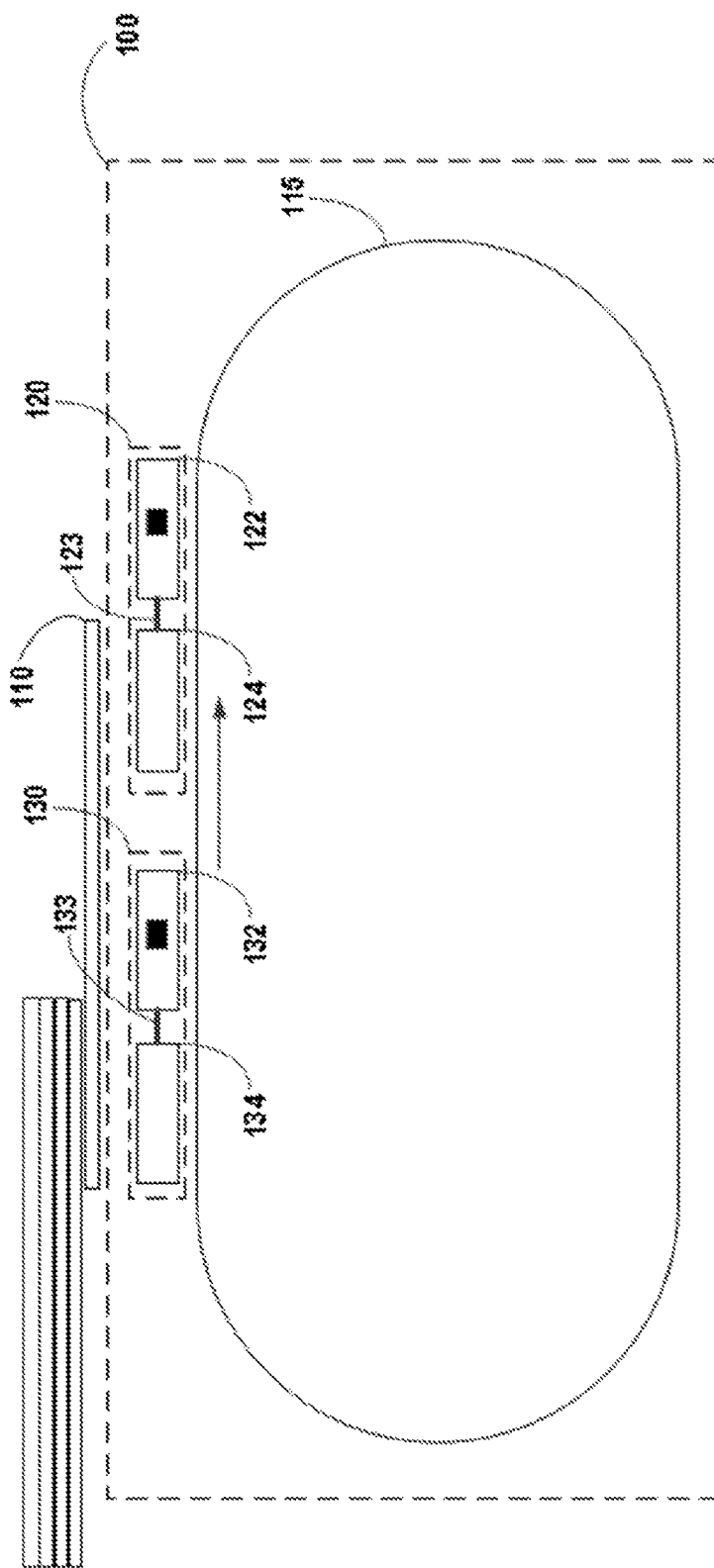
FIG. 1 is a side view schematically illustrating an example pallet conveyor for a printer according to an implementation.

FIG. 1 is a side view schematically illustrating an example pallet conveyor for a printer according to an implementation. Pallet conveyor 100 comprises a track 115 on which train pallet 122 and wagon pallet 124 circulate. Wagon pallet 124 is towed by train pallet 122. The train and wagon pallets may support a print substrate 110. In the example of FIG. 1, train pallet 122 tows only wagon pallet 124. However, the number of wagon pallets that may be towed by a single train pallet may vary. A train pallet may tow a wagon pallet configuration that may comprise a single wagon pallet or a plurality of wagon pallets coupled between them in a successive manner. The number of wagon pallets in a wagon pallet configuration may be limited by the size or power of the driving mechanism of the train pallet. As the number of wagon pallets in a wagon pallet configuration increases the train-and-wagon configuration may become more flexible. Accordingly, a wagon pallet configuration with fewer pallets may require a train pallet with smaller driving mechanism parts, such as motors.

The train pallet 122 may be the leading pallet of the train-and-wagon configuration 120 and the wagon pallet 124 may be the leading pallet of the wagon pallet configuration. In the example of FIG. 1, as there is only one wagon pallet in the wagon pallet configuration, the wagon pallet is also the last pallet of the train-and-wagon configuration. A coupling 123 may maintain the distance between the two pallets substantially constant as the pallets circulate the endless track 115. The train pallet 122 may comprise at least part of the driving mechanism that provides the motive power to the train-and-wagon configuration and may be operably coupled with the track 115. The track 115 may be an endless track. The wagon pallet 124 may be merely dragged by the train pallet 122 along the endless track and may not be individually controlled. The pallet conveyor may include multiple train-and-wagon configurations. In the example of FIG. 1, the pallet conveyor further includes train-and-wagon configuration 130. Train-and-wagon configuration 130 may comprise train pallet 132 coupled to wagon pallet 134 with coupling 133. As used in this document, "train pallet" means an active pallet bearing at least part of the driving mechanism of the train-and-wagon configuration and "wagon pallet" means a passive pallet dragged or towed by a train pallet either directly or indirectly. A wagon pallet may be directly dragged by a train pallet when it is directly coupled to a train pallet. However, a wagon pallet may form part of a wagon pallet configuration, i.e. a series of wagon pallets coupled together. In such a scenario, a particular wagon pallet may be indirectly dragged by a train pallet when it belongs to a wagon pallet configuration that is being dragged by a train pallet even though the particular wagon pallet is not directly coupled to the train pallet.

Coupling a wagon pallet configuration to a train pallet allows for the wagon pallet configuration to comprise wagon pallets that do not have any part of driving mechanism. The driving mechanism may comprise at least part of a motor, drivers, controllers and encoder heads. By providing only the train pallet with at least part of the driving mechanism it is possible to provide a pallet conveyor for a printer with improved cost-effectiveness and with lower bill-of-materials (BOM) as compared with pallet conveyors where all pallets are individually driven. In some implementations the encoder head may be arranged with the wagon pallet configuration. This may improve the motion accuracy as the train motor may generate some mechanical or electromagnetic noise, thus affecting the encoder head when the encoder head is arranged with the train pallet.

Figure 2:
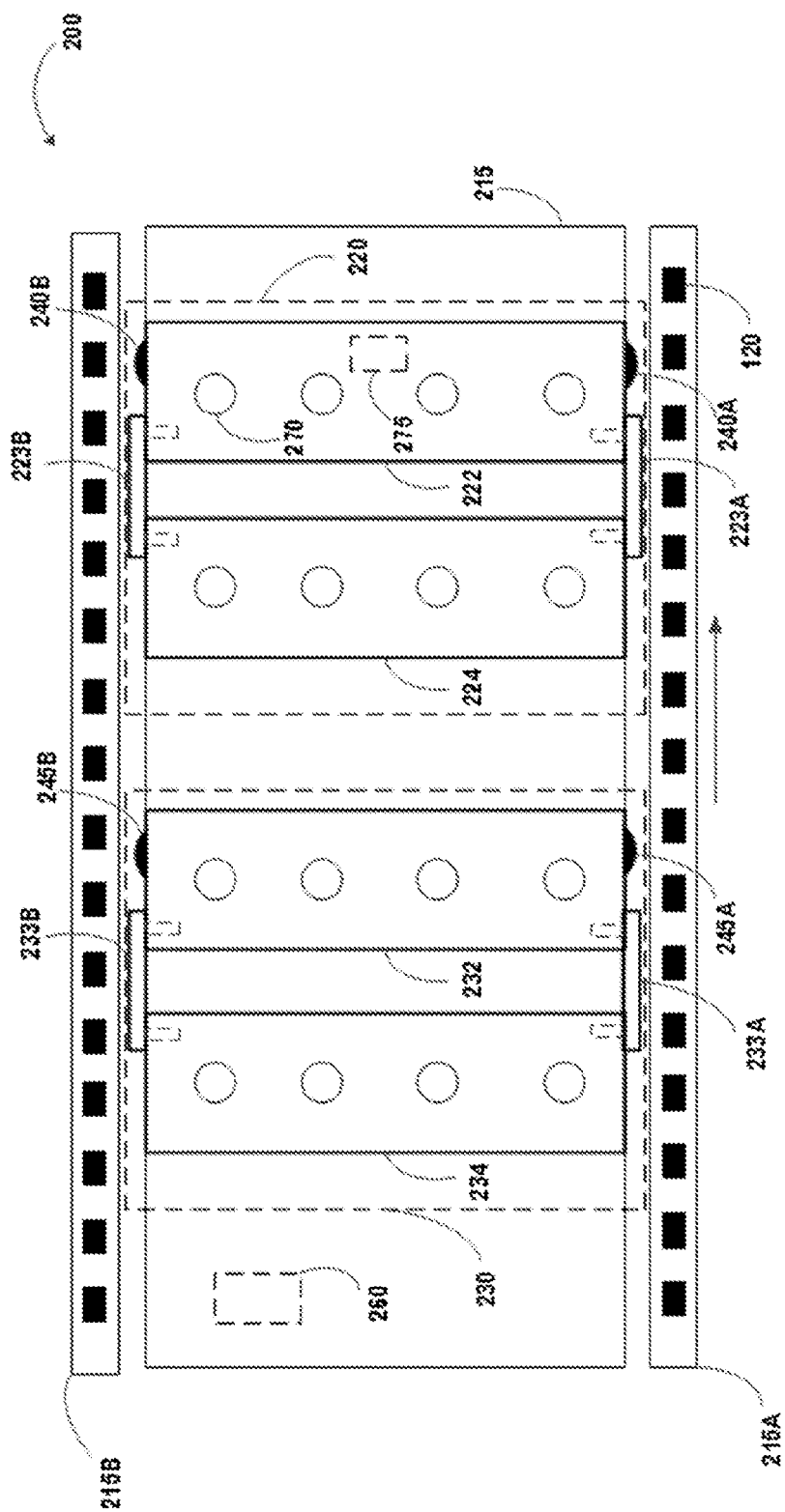
FIG. 2 is a top view schematically illustrating an example pallet conveyor for a printer according to an implementation.

FIG. 2 is a top view schematically illustrating an example pallet conveyor for a printer according to an implementation. Pallet conveyor 200 comprises an endless track 215 on which a plurality of pallets (222, 224, 232, 234) circulate. The plurality of pallets is arranged in train-and-wagon configurations (220, 230). More specifically, train-and-wagon configuration 220 comprises train pallet 222 coupled to wagon pallet 224. A coupling 223A is coupled on a first side of the train-and-wagon configuration 220. A first extreme of the coupling 223A is fixed to a first side of train pallet 222 and a second extreme of coupling 223A may be fixed to a first side of wagon pallet 224. Accordingly, a coupling 223B may be coupled to a second side of the train-and-wagon configuration 220. A first extreme of the coupling 223B may be fixed to a second side of train pallet 222 and a second extreme of coupling 223B may be fixed to a second side of wagon pallet 224. The couplings 223A and 223B may be rigid joints to maintain the distance between the two pallets substantially constant as the pallets circulate the endless track 215. The train pallet 222 may provide the motive power and may be operably coupled with the endless track 215. The train pallet and the endless track may be operably coupled together via a first portion disposed on each respective train pallet and a second portion disposed along a length of the track. One of the respective first and second portions may comprise an electromagnetic element and the other of the respective first and second portions may comprise a magnetically responsive material. For example, the train pallet may comprise at least part of a driving mechanism, such as a coil motor 240A on the first side and another motor 240B on the second side. The track may be equipped with the rest of the driving mechanism in the form of a plurality of magnets 250 along the sides of the track. The train pallets 222, 232 may also comprise encoders to provide the feedback controls. The wagon pallet 224 may be merely dragged by the train pallet 222 along the endless track and may not be individually controlled. Accordingly, train-and-wagon configuration 230 may comprise train pallet 232 coupled to wagon pallet 234 with couplings 233A and 233B and coil motors 245A, 245B on the sides of the train pallet 232, respectively. The pallet conveyor 200 may also comprise a central controller 260. The central controller may individually control the velocity of each train-and-wagon configuration along the track by controlling the velocity of each train pallet. It may communicate wirelessly with the train pallet controllers and transfer any motion control signals. Electricity may be transferred via sliding brushes. However, the described driving mechanism is only provided as an example. One skilled in the art may appreciate that any other driving mechanism may be used to drive the train pallets.

Each pallet may be equipped with an independent vacuum mechanism including a vacuum surface portion 270 located at a top portion of the pallets, and a vacuum source 275 to apply negative pressure or vacuum at vacuum surface portion 270 to draw and removably secure a print media against and relative to the top portion of the pallets.

However, in other embodiments, pallets of a pallet conveyor may include a vacuum mechanism in which the vacuum source is located remotely from the individual pallets. In yet other embodiments, the vacuum source may be arranged with the train pallet and may apply negative pressure or vacuum at vacuum surface portion 270 of all the pallets in the train-and-wagon configuration.

Figure 3:
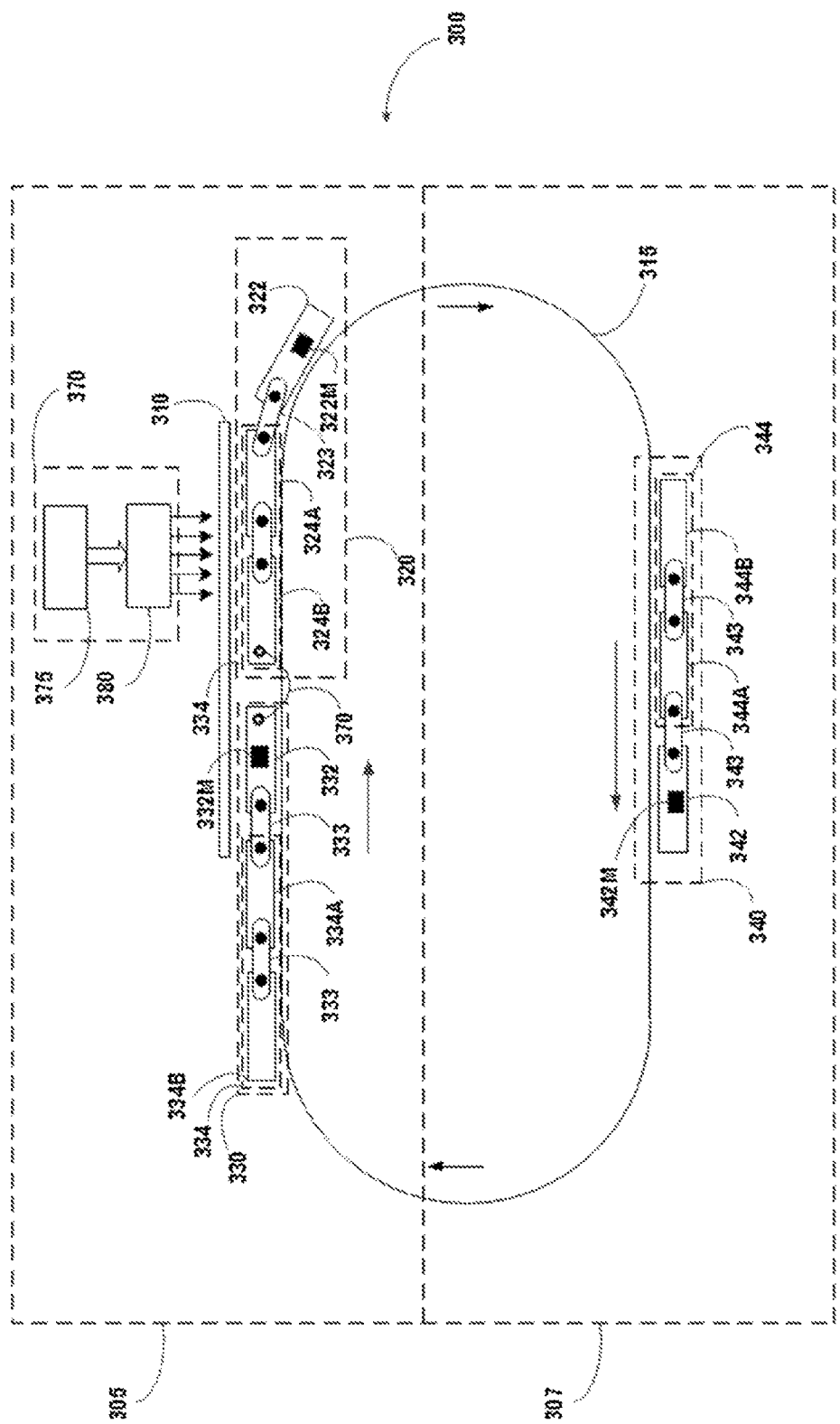
FIG. 3 is a side view schematically illustrating an example printer according to another implementation.

FIG. 3 is a side view schematically illustrating an example printer according to another implementation. Printer 300 comprises a printing mechanism 370 and a conveyor 315 on which multiple pallets (322, 324A, 324B, 332, 334A, 334B) may circulate. Printing mechanism 370 may include ink supplies 375 for supplying ink to a printhead assembly 380. Printhead assembly 380 may include an arrangement of one or more printheads for dispensing ink on to a sheet or continuous web of paper or other print substrate 310. Printhead assembly 380 may be stationary with a substrate wide array of printheads or carriage mounted to scan the printhead(s) back and forth across print substrate 310. The multiple pallets may be arranged in train-and-wagon configurations (320, 330). More specifically, train-and-wagon configurations 320, 330, and 340 may comprise train pallets 322, 332, and 342 coupled to wagon pallet configurations 324, 334, and 344, respectively. The train pallets may comprise at least part of a driving mechanism 322M, 332M and 342M. The train pallets may be coupled to the respective wagon pallet configurations with couplings 323, 333, 343 respectively. Couplings 323, 333, 343 may be rigid joints. The couplings may comprise a rigid central part with rotating axis on each side. The rotating axis may be fixed to the pallets and rotate with respect to the rigid central part. That is, the rigid central part may comprise two openings and the rotating axis may pass through the openings and may be fixed to the pallets. The rotating axis may have a head having a width larger than the width of the corresponding opening of the rigid central part so that the rigid central part is maintained in position. Alternatively, the rotating axis may be fixed to the rigid central part and rotate with respect to the pallets. Then the pallets may have corresponding openings to receive the rotating axis.

This type of rotating coupling may allow the wagon pallet following the train pallet to trail the train pallet in both flat and curved areas of the conveyor 315. Now, wagon pallet configurations 324, 334, 344 may comprise wagon pallets 324A, 324B, wagon pallets 334A, 334B, and wagon pallets 344A, 344B, respectively. That is, the wagon pallet configurations 324, 334, 344 may comprise 2 wagon pallets each. The wagon pallets of the wagon pallet configurations in the example of FIG. 3 may be coupled between them with the same type of rigid joint(s) as the one(s) used to couple the train pallet with the leading wagon pallet of the wagon pallet configuration. This allows the distance between the wagon pallets to remain steady when dragged by the respective train pallet. Accordingly, the train pallet may perceive the wagon pallet configuration as a single piece to minimize the reactive forces of the wagon pallet configuration to the respective train pallet.

The distance between train-and-wagon configurations may vary according to the needs of the printer. However, a flexible coupling element, acting as a distance limiter may be placed between a last wagon pallet of an advancing train-and-wagon configuration and a train pallet of a train-and-wagon configuration. This may limit the distance between train-and-wagon configurations to minimize the maximum gap that may be generated due to a malfunction or an error. In FIG. 3, a flexible coupling element 370 is placed between the wagon 324B of the train-and-wagon configuration 320 and the train pallet 332 of the train-and-wagon configuration 330. The flexible coupling element 370 may be in the form of an elastic joint. It may have a first part fixed to the side of the last wagon pallet of the preceding train-and-wagon configuration and a second part fixed to the train pallet of the following train-and-wagon configuration. A flexible part in the middle may only allow a predetermined maximum distance (gap) between the two train-and-wagon configurations. In some implementations, some wiring may pass from one train-and-wagon configuration to another, for example power supply from sliding brushes. Thus, the flexible coupling element 370 may prevent damage to the passing wires in case of malfunction.

The printer may comprise a print zone 305 wherein a portion of the pallets are to carry print media 310 along a forward track of the conveyor and a handling zone 307 to move the rest of the pallets, such as train-and-wagon configuration 340, along a return track of the conveyor to return them to the print zone. The printhead assembly 380 may be positioned in the print zone to print onto the print media carried by the pallets in the print zone. The distance maintained by the couplings between the pallets may be such that no print media may be trapped between two pallets. The selection of distance limiter, and therefore the distance, may also depend on the flexibility of the print media to be used in the printer.

In yet another implementation, two train-and-wagon configurations may be connected with a rigid joint, such as coupling 323. As the motors' highest force may be required only during the transition from handling zone 307 to printing zone 305, i.e. when the train pallet is at 90° degrees with respect to the print media 310 direction, only one pallet may be at such worst position at any given time while the rest may be at lower angles, thus requiring less force. Therefore, at any given time, the rest of the pallets may not require the full force of their respective motors. Therefore, connecting two train-and-wagon configurations with a rigid joint may allow the motors of two train pallets to contribute to the driving of the 90° degrees positioned pallet. Thus, smaller or less potent motors may be used overall.

FIG. 4 schematically illustrates a detail of a coupling between two pallets. Pallet 402 may be a train pallet or a wagon pallet. Pallet 404 may only be a wagon pallet. The two pallets may be coupled with a coupling 410. The coupling 410 may be a rigid joint. It may comprise a central rigid part 412 and two rotating axes 414, 416. Each axis may be coupled to an opening of the respective pallet. That way, the axis may rotate when the pallets do not belong to the same plane. However, the central rigid part may maintain the distance between the two pallets as they move along an endless track (not shown).

FIG. 5 schematically illustrates a detail of a coupling between two train-and-wagon configurations. Train-and-wagon configuration 502 may be coupled with train-and-wagon configuration 504. The last wagon pallet of train-and-wagon configuration 502 may be coupled to the train pallet of train-and-wagon configuration 504. A flexible coupling element 510 may be fixed at one end to a side of the wagon pallet of the train-and-wagon configuration 502 and at another end to a side of the train pallet of train-and-wagon configuration 504. The flexible coupling element 510 may comprise a first part 512 fixedly coupled to pallet 502, a second part 514 fixedly coupled to pallet 504 and an elastic or flexible central part to allow the two connected pallets to move freely between them up to a predetermined upper limit that corresponds to a safety distance (gap) between the two pallets.

Pallet conveyors for printers employing train-and-wagon configurations of the present invention may reduce the number of components used in the pallet conveyors and allow for a simpler construction with less maintenance needs. Wagon pallets may require less frequent servicing as they employ no active parts. Therefore, only train pallets may require servicing.

The invention claimed is:

1. A pallet conveyor for a printer comprising:
   a track;
   a train pallet to circulate on the track; and
   a wagon pallet to circulate on the track towed by the train pallet, the train and wagon pallets to support a print substrate.

2. The pallet conveyor of claim 1, wherein the train pallet is coupled to the wagon pallet with a coupling.

3. The pallet conveyor of claim 2, wherein the coupling is located at a side of the coupled pallets.

4. The pallet conveyor of claim 3, wherein the train pallet is coupled to the wagon pallet with a pair of couplings, each coupling to couple the train pallet with the wagon pallet at a different side of the coupled pallets.

5. The pallet conveyor of claim 2, wherein the coupling comprises a rigid joint having a first axis, a second axis and a rigid part, wherein the first axis is fixed to the train pallet and is rotatably coupled to a first extreme of the rigid part, and the second axis is fixed to the wagon pallet and is rotatably coupled to a second extreme of the rigid part.

6. The pallet conveyor of claim 5, wherein the wagon pallet is further coupled to another wagon pallet with a rigid joint.

7. The pallet conveyor of claim 1, wherein the track is an endless track.

8. A device for supporting a print substrate in a printer, comprising:
   multiple pallets;
   a conveyor including a forward track to circulate the pallets through a print zone to support the print substrate during printing, the conveyor further including a return track to receive pallets from the print zone and return pallets to the forward track,
   wherein the multiple pallets are arranged in train-and-wagon configurations, each train-and-wagon configuration having a wagon pallet towed by a train pallet.

9. The device of claim 8, wherein each train-and-wagon configuration is coupled to a preceding or a following train-and-wagon configuration with a coupling.

10. The device of claim 9, wherein the coupling is a flexible coupling element to limit the maximum possible distance between the coupled train-and-wagon configurations.

11. The device of claim 10, further comprising a controller to individually control a velocity of each train-and-wagon configuration along the conveyor.

12. The device of claim 11, wherein each train pallet and the conveyor are operably coupled together via:
    a first portion disposed on each train pallet, respectively; and
    a second portion disposed along a length of the conveyor,
    wherein one of the first and second portions comprises an electromagnetic element and the other of the first and second portions, respectively, comprises a magnetically responsive material, and
    wherein the controller is to electromagnetically control the velocity of the respective train-and-wagon configuration relative to the conveyor.

13. The device of claim 12, wherein the first portion comprises a coil motor and the plurality of second portions comprises a plurality of magnets.

14. The device of claim 13, wherein each pallet includes a vacuum mechanism to selectively apply a vacuum at a top portion of the pallet to removably secure the print substrate relative to the top portion of the pallet.

15. A printer, comprising:
    a printing mechanism defining a print zone to apply printing fluid to a print substrate;
    multiple pallets;
    an endless conveyor to circulate the pallets through the print zone to support a print substrate during printing, the endless conveyor including a forward track to guide pallets through the print zone and a return track to receive the pallets from the print zone and give them to the forward track; and
    wherein the multiple pallets include wagon pallets towed by train pallets on the endless conveyor.

* * * * *